United States Patent [19]

Yannopoulos et al.

[11] Patent Number: 4,520,157

[45] Date of Patent: May 28, 1985

[54] EARLY WARNING FIRE-DETECTION PAINT

[75] Inventors: Lymperios N. Yannopoulos, Penn Hills; Robert D. Straw, Murrysville; D. Colin Philips, Monroeville, all of Pa.

[73] Assignee: Westinghouse Electric Corp., Pittsburgh, Pa.

[21] Appl. No.: 452,264

[22] Filed: Dec. 22, 1982

[51] Int. Cl.³ .............................................. C08K 5/02
[52] U.S. Cl. ................................................ 524/462
[58] Field of Search ........................ 524/462, 544, 546

[56] References Cited

U.S. PATENT DOCUMENTS

| | | | |
|---|---|---|---|
| 3,256,230 | 6/1966 | Johnson, Jr. et al. | 260/29.6 |
| 3,386,977 | 6/1968 | Kleiner | 524/462 |
| 3,573,460 | 4/1971 | Skata | 250/83.6 |
| 3,824,126 | 7/1974 | Katsushima et al. | 524/157 |
| 3,957,014 | 5/1976 | Phillips et al. | 116/114 F |
| 3,973,438 | 8/1976 | Smith et al. | 73/339 R |
| 3,973,439 | 8/1976 | Smith et al. | 73/339 R |
| 3,975,352 | 8/1976 | Yoerger et al. | 524/462 |
| 3,979,353 | 9/1976 | Smith et al. | 260/33.6 EP |
| 4,015,015 | 3/1977 | Knowles | 424/324 |
| 4,046,733 | 9/1977 | Smith et al. | 260/33.6 EP |
| 4,056,005 | 11/1977 | Smith et al. | 73/339 R |
| 4,102,192 | 7/1978 | Smith et al. | 73/339 R |
| 4,102,193 | 7/1978 | Smith et al. | 73/339 R |
| 4,102,809 | 7/1978 | Smith et al. | 252/408 |
| 4,108,001 | 8/1978 | Smith et al. | 73/339 R |
| 4,142,416 | 3/1979 | Smith et al. | 73/339 R |

*Primary Examiner*—Paul R. Michl
*Assistant Examiner*—N. Sarofim
*Attorney, Agent, or Firm*—Blair R. Studebaker

[57] ABSTRACT

A latex base paint for providing an early warning of the presence of excessive heat or fire, which includes in combination with a conventional latex base paint a thermoparticulating agent in the form of an effective amount of a fluorinated polyacrylate.

3 Claims, No Drawings

EARLY WARNING FIRE-DETECTION PAINT

BACKGROUND OF THE INVENTION

One of the most significant threats to human life and property is that of fire. Whether the fire occurs in a private home, public accommodations such as hotels, theaters, nightclubs or offices, the earlier a warning is given the more likely that human lives can be saved and property damage minimized. As a result of several recent devastating fires most building codes now require that new housing construction as well as new public accommodations be equipped with conventional smoke and fire detectors. Additionally, some fire codes are requiring that existing buildings be equipped with fire and smoke detectors as a condition of continuing habitation. In general, most conventional smoke alarms are of the ion-chamber type similar to that disclosed in U.S. Pat. No. 3,573,460 for Ion Chamber Detector For Submicron Particles. The basic component of this type smoke detector is an ion chamber where an ionization current is generated between two electrodes having a radioactive source. The base line current is defined by environmental conditions and when additional particulates pass between the electrodes and combine with some of the current-carrying ions, a diminished current results. When a significant current drop is detected, the alarm is triggered. Under present conditions, these additional particulates are a product of the combustion of some material and is an indication that fire or at least smoke is already present. If a material that gives off particulates of sufficient size to actuate a smoke detector in response to excessive heat being present prior to actual combustion could be unobtrusively disposed in homes, offices, schools and other public accommodations, such an early warning could substantially contribute to the saving of human lives and property.

For several years, electrical apparatus have been treated with compositions which provide a thermoparticulating coating, which coating will cause a signal to be generated on a monitor to indicate the electrical apparatus is overheated. One such composition includes a malonic acid, a resinous carrier and a solvent, and is disclosed in U.S. Pat. No. 3,973,438 for Composition For Forming Thermoparticulating Coating Which Protects Electrical Apparatus. Most of the compositions which have been applied to electrical apparatus thermoparticulate at temperatures above that which is desired for an early warning system of an incipient fire condition in a home or public accommodation.

Since latex-base paints are used in almost every public and private building, a thermoparticulating agent which could be added to the latex-base paint without detracting from its expected appearance and function and, which would generate particulates at relatively low temperatures and be of a non-toxic nature, could prove to be a great boon to the saving of both lives and property.

SUMMARY OF THE INVENTION

In accordance with the present invention, a latex-base paint has admixed therewith an effective amount of a fluorinated polyacrylate solution. The fluorinated polyacrylate can be in the form of a commercial fabric fluoridizer and is preferably present in an amount of from about 5% to 21% of the total weight of the mixture. Since both commercially available latex-base paints and commercially available fabric fluoridizers contain a significant amount of volatile water, it is preferred that the fluorinated polymer be present in an amount of from about 1.5% to 7% of the total non-water constituents of the paint and polymer mixture.

A surface painted with a latex-base paint having the fluorinated polyacrylate additive of this invention disposed therein will activate a conventional smoke alarm within a few seconds of being heated to about 75° C. and long before any thermal degradation or combustion of the paint base material.

DESCRIPTION OF THE PREFERRED EMBODIMENT

In almost every home, office, hospital, school or commercial establishment, water-base latex paint is used as a surface preservative on either walls, ceilings or in some instances, even furnishings. It has been found that if an effective amount of a commercial fabric fluoridizer is admixed with the latex paint, thermoparticulation will occur when the painted surface is subject to excessive heat well below that amount of heat required to institute combustion. It has been further noted that these particulates are of such size that a conventional residential type smoke alarm will be actuated by the released particulates.

As is well known in the art, latex paint is normally classed in accordance with the relative proportions of pigment to vehicle wherein the pigment comprises titania and silicates and the vehicle comprises vinyl acetate acrylic resin and water, with a small percentage of ethylene glycol or propylene glycol added in some cases. The added tinting color is generally present in amounts of less than five percent of the total pigment and vehicle. A typical so-called antique white paint has the following formula:

| PIGMENT 28.0% | |
|---|---|
| Titanium Dioxide (Type III) | 21.8% |
| Silica | 1.4 |
| Silicates | 4.8 |
| VEHICLE 72.0% | |
| Vinyl Acetate Acrylic Resin | 23.8 |
| Ethylene Glycol | 2.6 |
| Volatile (Water) | 45.6 |
| Tinting Color Less Than 5% | 100.0% |

A typical white paint has the following formula:

| PIGMENT 33.8% | |
|---|---|
| Titanium Dioxide (Type III) | 11.5% |
| Silicates | 22.3 |
| VEHICLE 66.2% | |
| Vinyl Acetate Acrylic Resin | 13.1 |
| Volatile (Water) | 53.1 |
| Tinting Color Less than 5% | 100.0% |

A typical high gloss enamel has the following formula:

| PIGMENT 24.0% | |
|---|---|
| Titanium Dioxide (Type III) | 23.7% |
| Silicates | .3 |
| VEHICLE 76.0% | |
| Acrylic Resin | 1.9 |
| Vinyl Acetate Acrylic Resin | 26.0 |
| Propylene Glycol | 5.7 |
| Volatile (Water) | 42.4 |

| | |
|---|---|
| Tinting Color Less Than 5% | 100.0% |

Fluorine containing polymers have been employed for many years as water and oil repellents for textiles, and similar materials. Typical fluorinated polymers used for this purpose are disclosed in U.S. Pat. No. 3,256,230 for Polymeric Water And Oil Repellents. A typical commercially available fabric fluoridizer identified as "Zepel RN" manufactured by the E. I. du Pont de Nemours and Co., Wilmington, Delaware is extremely effective when mixed with a standard water-base latex paint for providing the thermoparticulate material to the paint. This commercially available fabric fluoridizer includes about 14% by weight polymers, 4% by weight ethylene glycol, 0.3% by weight isopropanol and about 82% by weight of water. As shown hereinbefore, water-base latex paint includes roughly about 50% by weight of water, with the remainder comprising pigment generally in the form of titanium dioxide and silicates, and the vinyl acrylic resin in various proportions. The ratio of the weight of the fluorinated polymers to the weight of the non-water constituents of the paint should be from about 1.5% to about 7%. As will be illustrated later, less than about 1.5% polymer to non-water content of the paint gives either no signal or an intermittent signal in the test environment. Polymer content in excess of about 7% by weight of polymer with respect to the non-water constituents of the paint will, of course, still provide the thermoparticulating function when heated, but is no longer a cost effective amount.

The structure of a typical fluorinated polyacrylate of the type present in commerical fabric fluoridizers is as follows:

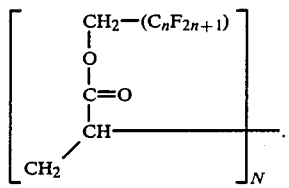

For purposes of this invention, n is preferably from 1 to 9 and N is preferably from 5 to 4,000 with the presence of a significant number of long-chain polymer molecules.

The invention was tested within an enclosure that simulated the space of an office cubicle; its dimensions were 10'×8'×8'10". Polyethylene sheet was used for its construction. Ventilation of the area was provided by an exhaust fan and three ionization type household smoke detectors, specifically Honeywell, Model TC 49A, were employed. These smoke detectors were attached to the ceiling approximately 9' above the specimen, smoke detector #1 was almost directly above the specimen. Smoke detector #2 was situated approximately 6' laterally of the specimen and smoke detector #3 approximately 2½' laterally of smoke detector of #1 in an opposite direction of smoke detector #2. A commercially available 1500 watt electric space heater, Model RP 40A1 of Titian Sales Corp. was employed to heat the samples as indicated on the following chart. Aluminum foil was employed as the substrate and tests were made on each of the bare aluminum foil, aluminum foil coated with undoped paint and latex paint doped with various amounts of the Zepel RN commercial fabric fluoridizer. The latex-base paint was Sherman-Williams Classic 99, interior semi-gloss latex enamel having the following typical latex-base paint composition:

| PIGMENT 27% | |
|---|---|
| Titanium Dioxide (Type III) | 26 |
| Cacium Carbonate | 1 |
| VEHICLE 73% | |
| Acrylic Resin | 21 |
| Glycols | 4 |
| Water | 48 |
| Tinting Material Less Than 5% | 100% |

The Zepel RN included about 14% by weight of fluorinated polymer.

TABLE 1

Response of Smoke Detector to the Particulate Matter of Pure and Doped Flatwall Latex Paint Heated by the Electric Space Heater

| Sample | Weight Percent of Zepel "RN" in Latex Paint | Distance of Sample from Space Heater (in.) | Response Time of Smoke Detectors (sec) | | |
|---|---|---|---|---|---|
| | | | #1 | #2 | #3 |
| Aluminum Foil | — | 2 | (no signal up to 300 sec) | | |
| Aluminum Foil + Paint | — | 2 | (no signal up to 300 sec) | | |
| | | 1 | (no signal up to 300 sec) | | |
| Aluminum Foil + Doped Paint | 33. | 2 | 19 | 22 | 19 |
| Aluminum Foil + Doped Paint 4 Repeated Runs | | | | | |
| 1 | 21. | 2 | 23 | 45 | 26 |
| 2 | | 2 | 23 | 63 | 29 |
| 3 | | 2 | 29 | 62 | 43 |
| 4 | | 2 | 24 | 79 | 35 |
| Aluminum Foil + Doped Paint | 12. | 2 | 45 | 80 | 45 |
| Aluminum Foil + Doped Paint 2 Repeated Runs | | | | | |
| 1 | 5. | 2 | 60 | 85 | 60 |
| 2 | | 2 | 79 | (no signal up to 300 sec) | 80 |
| Aluminum Foil + Doped Paint | 2.7 | 2 | 97 & 120* | (no signal up to 300 sec) | 130, 142, & 150* |
| Aluminum Foil + Doped Paint | 1.4 | 2 | (no signal up to 300 sec) | | |

*Signals were intermittent, continuous signals were not achieved

As will be apparent from the foregoing tests, there were no responses from the smoke detectors when the base aluminum or undoped, painted aluminum samples were subjected to heat. Samples with less than 5% by weight fluoridizer took longer than desired to respond or did not respond at all. When from about 5% to 21% commercial fabric fluoridizer is added to the latex-base paint, there is smoke detector response in less than a minute and a half. The presence of more than 25% by weight of the fabric fluoridizer does not significantly improve response time. The fabric fluoridizer employed in these tests included about 14% by weight of long-chain fluorinated polyacrylates which generate particulates larger than 25 angstroms in size thereby triggering a conventional household-type smoke detector. The ratio of fluorinated polyacrylates in the test mixture to the non-water constituents of the modified latex paint translate into about 7 wt. % for the 21.0% tests and about 1.5 wt. % for the 5% tests.

As can be seen from the foregoing, by admixing an effective amount of fluorinated polyacrylates with water-base latex paint, an effective early warning system will be provided which will cause conventional household smoke detectors to indicate the presence of excessive heat and a potentially incipient fire situation long before products of actual combustion reach the smoke detectors and may provide a significant early warning which results in the preservation of both property and human life.

What is claimed is:

1. A latex paint for providing in its applied environment an early warning signal of the presence of excessive heat or fire by generating, a non-combustion temperatures, particulates of sufficient size to actuate an ion-chamber smoke detector, said latex paint prior to application substantially comprising a pigment and a vehicle with water being the principal component of the vehicle, and said paint having admixed therewith an effective amount of fluorinated polyacrylate having the following structure:

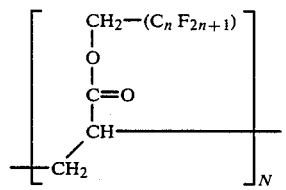

wherein n is 1 to 9 and N is 5 to 4,000.

2. The latex paint as specified in claim 1, wherein said effective amount of fluorinated polyacrylate is from about 1.5% to about 7% by weight of the non-water content of said latex paint.

3. A latex paint mixture for producing, in its applied environment, an early warning of the presence of excessive heat from a painted surface, said latex paint mixture prior to application substantially comprising a mixture of pigment and vehicle and having admixed therewith a predetermined proportion of solution which includes a thermoparticulating agent, said solution which includes said thermoparticulating agent being present in an amount of from about 5% to about 21% by weight of said mixture and said thermoparticulating agent is a fluorinated polyacrylate comprising about 14% by weight of said solution, said fluorinated polyacrylate having the following structure;

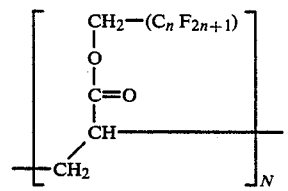

wherein n is 1 to 9 and N is 5 to 4,000.

* * * * *